United States Patent [19]
Sakong

[11] Patent Number: 5,864,929
[45] Date of Patent: Feb. 2, 1999

[54] SNAP RING

[76] Inventor: Cheol Sakong, 1009 Woolim Apt. 244-6, Janglim-2Dong, Saha-ku Busan-City, Rep. of Korea

[21] Appl. No.: 78,272

[22] Filed: May 14, 1998

[51] Int. Cl.$^6$ .............................. A44B 13/00; F16B 45/00
[52] U.S. Cl. ..................... 24/600.1; 24/599.5; 24/599.9
[58] Field of Search ................................ 24/600.1, 600.2, 24/600.3, 599.9, 599.8, 599.7, 599.6, 599.5, 599.4

[56] References Cited

U.S. PATENT DOCUMENTS

| | | | |
|---|---|---|---|
| 0,731,162 | 6/1903 | Carter | 24/600.1 |
| 1,546,208 | 7/1925 | Cunningham | 24/599.5 |
| 1,879,168 | 9/1932 | Freysinger | 24/600.1 |
| 5,257,441 | 11/1993 | Barlow | 24/600.1 |
| 5,517,735 | 5/1996 | Tsai | 24/600.3 |

*Primary Examiner*—Victor N. Sakran
*Attorney, Agent, or Firm*—Jacobson, Price, Holman & Stern, PLLC

[57] ABSTRACT

A snap ring includes a body made of iron or steel, which has a fixing ring on its head in a semicircular or triangular shape and a rotatably and laterally joined rope guiding pulley on its inner lower portion. The snap ring further includes a link bar hinged to open or close the body, and a locking device for locking or unlocking the link bar. The closing procedure is performed by the link bar's hook and the locking device's locking hole provided with a resilient force by a coil spring. In unlocking, the link bar is released by raising the locker with a finger put into the locking device's unfastening hole. This prevents the rope from escaping from the snap ring, contrary to the prior art, as well as providing simplified and easy-to-operate structure. Accordingly, the snap ring of the present invention prevents industrial damages.

2 Claims, 4 Drawing Sheets

SNAP RING

FIELD OF THE INVENTION

The present invention relates to a snap ring for guiding a rope for use in hauling a net from a vessel or other heavy objects from a general crane.

BACKGROUND OF THE INVENTION

An existing snap ring is formed to have a detachable downwardly slant portion on one side of its body, through which a rope passes. This structure causes for the rope to easily escape from the snap ring due to the imperfect slant portion. In addition, the possibly escaping rope is very dangerous for people. Despite many modifications on the snap ring part where a rope is inserted, they are defective in structure so that the rope is inconveniently inserted or drawn out.

SUMMARY OF THE INVENTION

In order to overcome such drawbacks of the prior art, this invention is devised to provide a snap ring whose opening section located on one side of the body is easily opened/closed, preventing a rope from escaping, as well as simplifying its insertion or drawing out.

In order to accomplish the object of the present invention, there is provided a snap ring having a body made of iron or steel, the body having a fixing ring on its head in a semicircular or triangular shape and a rotatably and laterally joined rope guiding pulley on its inner lower portion, the snap ring further comprising: a link bar hinged to open or close the body on one side opposing the body's two upper and lower portions, the link bar having a ring-shaped hook on its upper portion; a locking device formed on the lower end of the fixing ring placed on the body's head and for locking or unlocking the link bar, the locking device having a locker receptacle formed by rendering the body's inside hollow and hexahedral, and a hinged locker, the locker receptacle having a circular unfastening hole in its front and a hinge joining bump at the center opposing the opening, the locker having a recess as a hinged part and a locking hole into which the link's hook is fitted, the locking hole being rectangular piercing the locker from top to bottom at an end opposing the recess, the locker being hinged with a coil spring in the locker receptacle so that the locker always receives a downward resilient force.

BRIEF DESCRIPTION OF THE ATTACHED DRAWINGS

These and other features of the invention will be understood more clearly from the following description, read in conjunction with the drawings, in which.

DETAILED DESCRIPTION OF PREFERRED EMBODIMENTS

Hereinafter, preferred embodiments of the present invention will be described with reference to the attached drawings.

Figure 1:
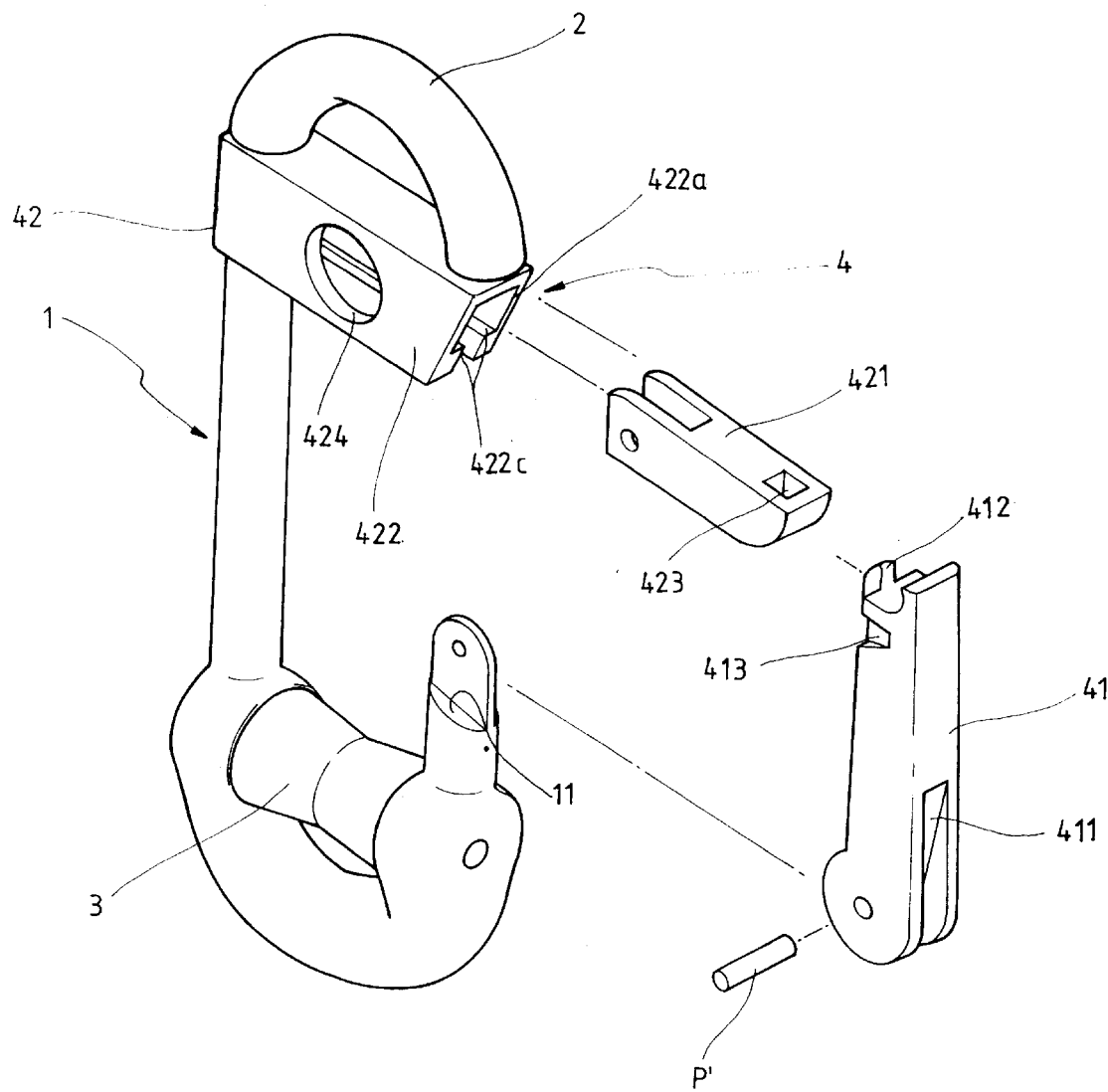
FIG. 1 is an exploded perspective of one embodiment of a snap ring of the present invention.

Referring FIG. 1, one embodiment of the snap ring of the present invention has a body 1 made of iron or steel. A semicircular fixing ring 2 is formed on the body's head. On the lower part of the body 1, a rope guiding pulley 3 is installed horizontally thereinside, which is rotatable. On one side of two facing sides of body 1, a snap ring opening section 4 is formed to open/closing the snap ring body 1. The snap ring opening section consists of a link bar 41 hinged on one side of body 1, and a locking device 42 forming the lower end of fixing ring 2.

One end of link bar 41 is rounded for hinge joining on one side of body 1, with a central recess. On the center of the split end, a pin acceptor is formed to which a hinge pin P' is inserted. The end has a stopping plate 411 in an approximately triangular form.

The other end of link bar 41 has a hook 412 protruded upward and inward. On each side of link bar 41 forming the root of hook 412, a stopping recess 413 is provided.

The locking device 42 is constructed in such a manner that a hollow locker receptacle 422 for accepting a later mentioned locker 421 is integrally formed with body 1 on the lower end of fixing ring 2 placed on the top of body 1. The locker receptacle 422 has an opening 422a opened on the lateral end and through which the top of link bar 41 goes. On the blocked wall of locker receptacle 422 opposite to opening 422a, a hinge joining bump 422b (not shown in FIG. 1 but in FIG. 2A) is formed so that locker 421 is hinged. Another pin acceptor into which a hinge pin P (not shown in FIG. 1 but in FIG. 2A) is inserted is formed laterally from hinge joining bump 422b.

On the front surface of locker receptacle 422, a unfastening hole 424 piercing the inside is provided for use in unlocking the locker. Two detents 422c fitting into two stopping recesses 413 formed on link bar 41 are made on the bottom of opening 422a of locker receptacle 422.

The locker 421 is formed approximately in "" shape. With a recess, one laternal end is split so that it is joined with hinge joining bump 422b formed on the inside of locker receptacle 422. The split end part corresponds to a locker hinge in which the pin acceptor is provided laterally, into which hinge pin P is inserted.

On the other end of locker 421, a rectangular locking hole 423 is formed piercing the locker. The hook 412 of link bar 41 is fitted into locking hole 423 so that link bar 41 is fastened to locking device 42, making the body 1 in form of snap ring.

Figure 3:
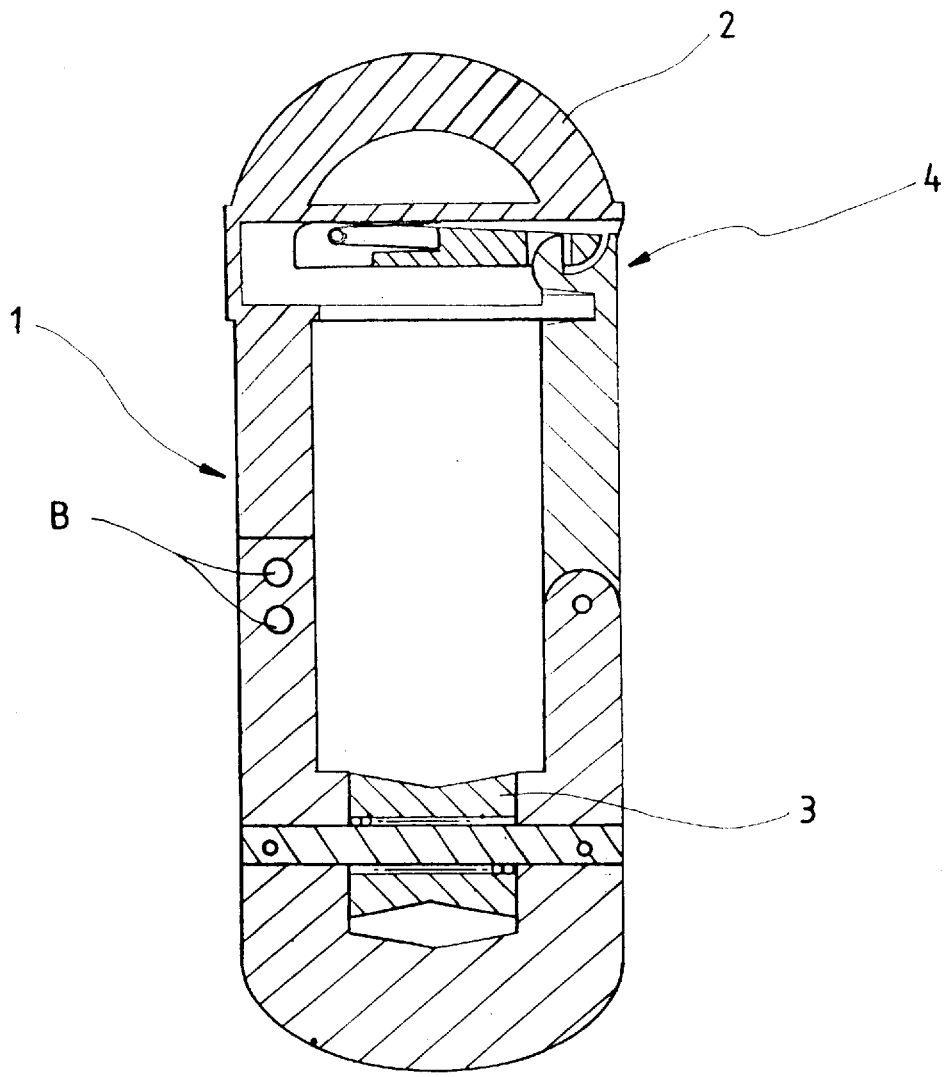
FIG. 3 is a section of another embodiment of the snap ring of the present invention.

In another embodiment of the present invention, the lower portion of body 1 opposing the portion where locking device 42 is placed is made to be detachable or joinable, as in FIG. 3. Referring to FIG. 3, it is noted that the lower portion of body 1 is fastened with two screw bolts B.

The assembly and operation of the snap ring of the present invention constructed with the above-stated components will be explained below.

Figure 2A:
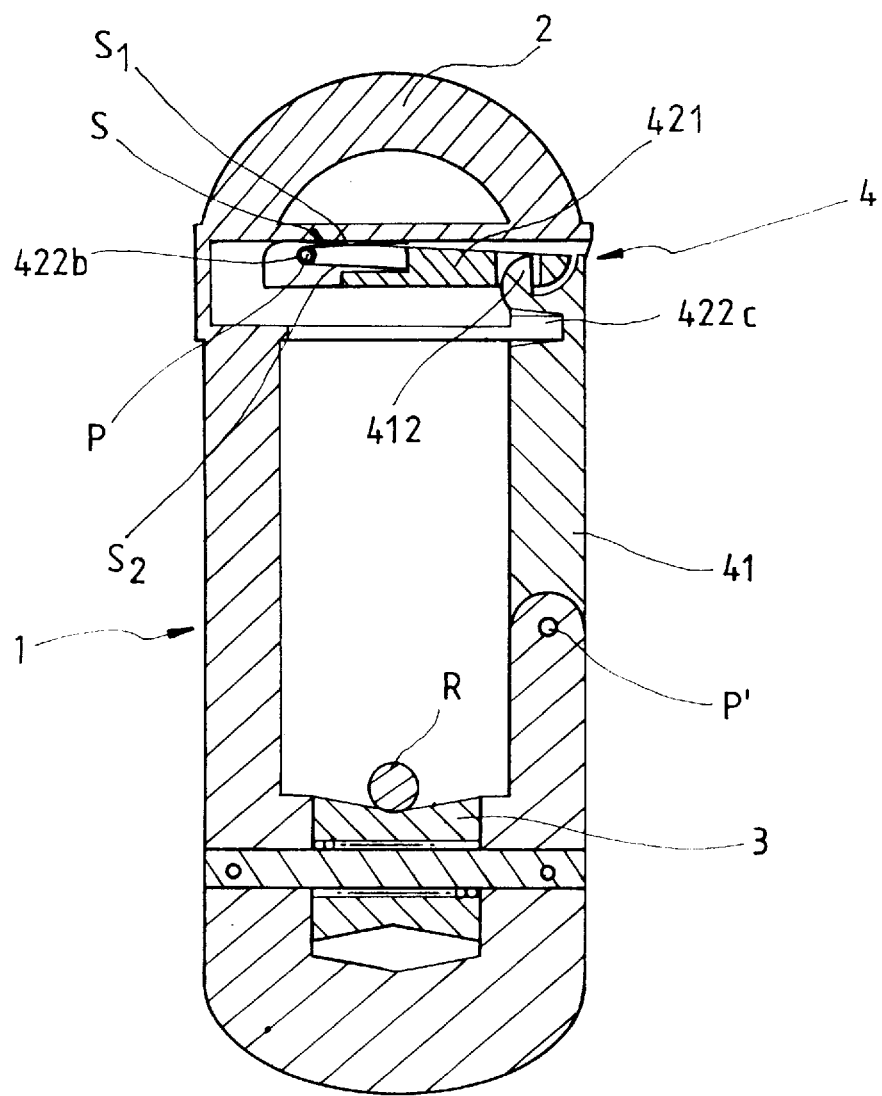
FIG. 2A is a vertical section of the snap ring when in use.
Figure 2B:
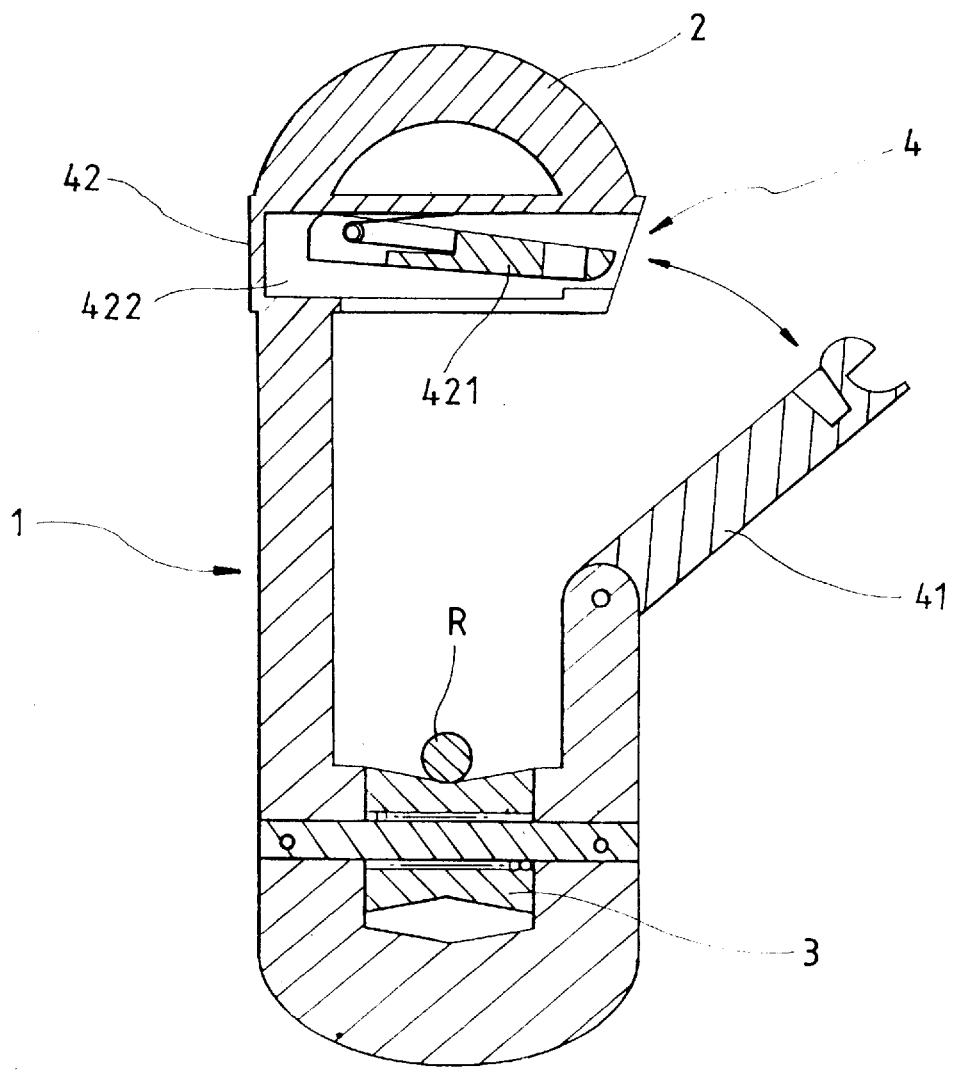
FIG. 2B is a vertical section of the snap ring whose link bar is released.

FIGS. 2A and 2B are vertical sections of showing the assembly and operation of the snap ring of the present invention, Specifically FIG. 2A showing the state in which a rope is inserted into the snap ring assembled, and FIG. 2B the state in which link bar 41 is unfastened in order to draw the rope out of the snap ring assembled.

As in FIG. 2A, link bar 41 of snap ring opening section 4 is rotatably joined with body 1 on one side thereof by hinge pin P'. Locking device 42 of snap ring opening section 4 is joined in such a manner that the split ends of locker 421 are fitted to hinge joining bump 422b placed in locker receptacle 422 and then joined with hinge pin P. To hinge pin P, a coil spring S is inserted so that one side end S1 of it supports the bottom of locker 421 and that the other side end S2 is joined by locker 421 placed in locker receptacle 422. With the resilient force of coil spring S, locker 421 placed in locker receptacle 422 receives a force toward the bottom surface of locker receptacle 422.

The locker 421 is lowered downward by coil spring S so that hook 412 formed on the upper portion of link bar 41 is fitted into locking hole 423 of locker 421. Here, two detents 422c formed on opening 422a of locker receptacle 422 are fitted into two stopping recesses 413 provided on both sides of hook 412 of link bar 41. This allows the snap ring to be joined while snap ring opening section 4 closes it.

In order to open snap ring opening section 4, a finger is inserted into unfastening hole 424 formed on the front of locker receptacle 422 to raise locker 421 pressed by coil spring S with the finger's force. In this situation, hook 412 of link bar 41 escapes from locking hole 423 of locker 421 so that link bar 41 is released from locking device 421. When link bar 41 is pulled back outward, snap ring opening section 4 opens the snap ring of the present invention. This procedure appears in FIG. 2B. The angle of pulling back link bar 41 is determined by stopping plate 411 formed on the lower hinge of link bar 41 and a catch of a stopping plate formed on body 1.

When rope R is put inside and caught by rope guiding pulley 3 with snap ring opening section 4 being opened, and then link bar 41 of snap ring opening section 4 is raised and pushed toward opening 422a of the locker receptacle placed in locking device 42, hook 412 of link bar 41 is pushed to raise locker 421 so that it is automatically fitted into locking hole 423 of locker 421 and that at the same time two detents 422c of opening 422a of locker receptacle 422 are fitted into two stopping recesses 413 of link bar 41. By doing so, link bar 41 and locking device 42 of snap ring opening section 4 engage with each other stably, preventing rope R from escaping from body 1. In addition, the snap ring of the present invention stays mechanically stable when the weight of the rope influences link bar 41 because two detents 422c placed on the bottom of opening 422a of locker receptacle 422 are inserted into two stopping recesses 413 placed in link bar 41. (see FIG. 2A)

The snap ring of the present invention is able to raise or haul a net or other heavy objects fixed on the lower end of rope R by guiding the rope in tight contact with rotary rope guiding pulley 3 after fastening hook 412 to fixing ring 2 formed on the snap ring's head.

In conclusion, the snap ring of the present invention is made so that the body 1 opens or closes with link bar 41 and locking device 42 of snap ring opening section 4. The closing procedure is performed by hook 412 of link bar 41 and locking hole 423 of locker 421 provided with a resilient force by coil spring S. In unlocking, link bar 41 is released by raising locker 421 with a finger put into unfastening hole 424 of the locking device. This prevents the rope from escaping from the snap ring, contrary to the prior art, as well as providing simplified and easy-to-operate structure. Accordingly, the snap ring of the present invention prevents industrial damages.

It will be apparent to the reader that the foregoing description of the invention has been presented for purposes of illustration and description and for providing an understanding of the invention and that many changes and modifications can be made without departing from the scope of the invention. It is therefore intended that the scope of the invention be indicated by the appended claims rather than by the foregoing description; and all changes which come within the meaning and range of equivalency of the claims are therefore intended to be embraced therein.

What is claimed is:

1. A snap ring having a body made of iron or steel, the body having a fixing ring on its head in a semicircular or triangular shape and a rotatably and laterally joined rope guiding pulley on its inner lower portion, the snap ring further comprising:

a link bar hinged to open or close the body on one side opposing the body's two upper and lower portions, the link bar having a ring-shaped hook on its upper portion;

a locking device formed on the lower end of the fixing ring placed on the body's head and for locking or unlocking the link bar, the locking device having a locker receptacle formed by rendering the body's inside hollow and hexahedral, and a hinged locker, the locker receptacle having a circular unfastening hole in its front and a hinge joining bump at the center opposing the opening, the locker having a recess as a hinged part and a locking hole into which the link's hook is fitted, the locking hole being rectangular piercing the locker from top to bottom at an end opposing the recess, the locker being hinged with a coil spring in the locker receptacle so that the locker always receives a downward resilient force.

2. The snap ring as claimed in claim 1, wherein a stopping recess is formed on each side of the link bar at the bottom end of the hook, and a detent is protrudently formed on each bottom side of the opening in the locker receptacle so that the recesses and detents are fitted when the link bar and the locking device are fastened.

* * * * *